US010395452B2

(12) United States Patent
Morrison et al.

(10) Patent No.: US 10,395,452 B2
(45) Date of Patent: Aug. 27, 2019

(54) SYSTEMS AND METHODS FOR ENABLING ACCESS CONTROL VIA MOBILE DEVICES

(71) Applicant: HONEYWELL INTERNATIONAL INC., Morristown, NJ (US)

(72) Inventors: John David Morrison, Mt Colah (AU); Sanjay Roy, Maharashtra (IN)

(73) Assignee: Honeywell International Inc., Morris Plains, NJ (US)

(*) Notice: Subject to any disclaimer, the term of this patent is extended or adjusted under 35 U.S.C. 154(b) by 51 days.

(21) Appl. No.: 14/307,943

(22) Filed: Jun. 18, 2014

(65) Prior Publication Data
US 2014/0375421 A1 Dec. 25, 2014

(30) Foreign Application Priority Data

Jun. 20, 2013 (AU) ................................ 2013902236

(51) Int. Cl.
G07C 9/00 (2006.01)
G06F 21/35 (2013.01)
H04W 12/06 (2009.01)
H04W 12/08 (2009.01)
H04L 29/06 (2006.01)
H04W 4/80 (2018.01)

(52) U.S. Cl.
CPC ......... G07C 9/00007 (2013.01); G06F 21/35 (2013.01); G07C 9/00571 (2013.01); H04L 63/0853 (2013.01); H04L 63/0861 (2013.01); H04W 12/06 (2013.01); H04W 12/08 (2013.01); G07C 2009/00793 (2013.01); H04W 4/80 (2018.02)

(58) Field of Classification Search
None
See application file for complete search history.

(56) References Cited

U.S. PATENT DOCUMENTS

| | | | |
|---|---|---|---|
| 7,012,503 B2 * | 3/2006 | Nielsen | G07C 9/00103 340/5.6 |
| 8,593,249 B2 * | 11/2013 | Bliding | E05B 49/00 340/5.2 |
| 8,792,936 B2 | 7/2014 | Rajendran et al. | |
| 2010/0201536 A1 * | 8/2010 | Robertson | G07C 9/00904 340/686.6 |
| 2012/0092127 A1 | 4/2012 | Ganapathi et al. | |

(Continued)

FOREIGN PATENT DOCUMENTS

EP 2192560 A1 6/2010
WO 2006136662 A1 12/2006

OTHER PUBLICATIONS https://www.merriam-webster.com/dictionary/track.*

(Continued)

Primary Examiner — Daniell L Negron
(74) Attorney, Agent, or Firm — Seager, Tufte & Wickhem LLP

(57) ABSTRACT

Described herein are systems and methods for enabling access control via mobile devices. Embodiments of the invention have been particularly developed for allowing a user to gain access to a controlled functionality (for example the unlocking of a door) using a smartphone or the like. These leverage short-range wireless communications, such as Bluetooth Low Energy or Near Field Communications.

21 Claims, 8 Drawing Sheets

(56) References Cited

U.S. PATENT DOCUMENTS

| | | | |
|---|---|---|---|
| 2012/0169461 A1* | 7/2012 | Dubois, Jr. | G07C 9/00571 340/5.61 |
| 2012/0230489 A1 | 9/2012 | Cho | |
| 2012/0234058 A1* | 9/2012 | Neil | G07C 9/00571 70/91 |
| 2013/0214898 A1 | 8/2013 | Pineau et al. | |
| 2013/0257589 A1* | 10/2013 | Mohiuddin | G08C 17/02 340/5.61 |
| 2013/0268998 A1 | 10/2013 | Ko et al. | |
| 2013/0311373 A1 | 11/2013 | Han et al. | |
| 2013/0332367 A1 | 12/2013 | Quigley et al. | |
| 2014/0084059 A1 | 3/2014 | Sierchio et al. | |
| 2014/0089178 A1 | 3/2014 | Lee et al. | |
| 2014/0159660 A1 | 6/2014 | Klose et al. | |
| 2014/0189880 A1 | 7/2014 | Funk | |
| 2014/0277935 A1* | 9/2014 | Daman | G08G 1/127 701/36 |
| 2015/0227969 A1* | 8/2015 | Hanly | G06Q 30/0252 705/14.5 |

OTHER PUBLICATIONS https://youtu.be/D1L3o88GKew, "Lockitron—Keyless Entry Using Your Phone", Lockitron, Oct. 2, 2012.*
International Search Report for Corresponding Application No. EP14173062 dated Dec. 5, 2014.
MicroStrategy, "Secure Business Intelligence on Apple(R) Mobile Devices," Microstrategy Incorporated, 2011, 20 pages. COLL-0967 0511.
Usher, "Safe and Secure Mobile Identity Network," Microstrategy Incorporated, 2013 2 pages. COLL-1085 1012.

* cited by examiner

SYSTEMS AND METHODS FOR ENABLING ACCESS CONTROL VIA MOBILE DEVICES

The present application claims priority to Australian Patent Application No. 2013902236, filed on Jun. 20, 2013, entitled "SYSTEMS AND METHODS FOR ENABLING ACCESS CONTROL VIA MOBILE DEVICES".

FIELD OF THE INVENTION

The present invention relates to systems and methods for enabling access control via mobile devices. Embodiments of the invention have been particularly developed for allowing a user to gain access to a controlled functionality (for example the unlocking of a door) using a smartphone or the like. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

Access control systems are commonly made up of access control devices, which are situated at locations of controlled functionalities (for example at doors which are locked/unlocked by way of access control devices), these access control devices being configured to make access control determinations. For example, a user presents a token (such as a smartcard), and the access control device makes a determination as to whether or not access is to be granted. For example, this may involve an authentication and authorisation process.

In recent times, particularly with increases in popularity of Near Field Communications (NFC) technology and the like in mobile devices, various access control systems have been configured to allow a user to provide a mobile device as an alternative to a smartcard. For example, user credentials are maintained on the phone, and read via NFC by an access control device. Whilst, from a user perspective, this provides beneficial functionalities, there are various reasons for which it is not ideal technologically. For example, there are concerns as to security of NFC communications, and increased costs and complexities in access control devices.

SUMMARY OF THE INVENTION

It is an object of the present invention to overcome or ameliorate at least one of the disadvantages of the prior art, or to provide a useful alternative.

One embodiment provides a method, performed at an access control server, for selectively granting access to a controlled functionality, the method including:

(i) receiving, via networked communications from a mobile device, data indicative of (i); an identifier read by the mobile device using short-range wireless communications and (ii) a mobile device identity;

(ii) determining, based on the data indicative of the device identity, a specific access control functionality;

(iii) determining, based on at least the data indicative of the mobile device identity, whether or not access to the specific access control functionality is to be granted; and (iv) in the case that the specific access control functionality is to be granted, sending a signal to a network location associated with the specific access control functionality, thereby to control a hardware component that is configured to grant access to the specific access control functionality.

One embodiment provides a method 1 wherein (i) additionally includes receiving, from the mobile device, biometric data captured by the mobile device, and wherein (iii) includes determining, based on at least the data indicative of the mobile device identity and the biometric data, whether or not access to the specific access control functionality is to be granted One embodiment provides a method wherein the specific access control functionality is the unlocking of a specific door.

One embodiment provides a method wherein the identifier is read from a readable token positioned proximal the specific door.

One embodiment provides a method wherein locking/unlocking of the specific door is controlled by an electrical actuator.

One embodiment provides a method wherein the electrical actuator is configured to receive a control signal via a network.

One embodiment provides a method wherein the electrical actuator is configured to connect to a local wireless network.

One embodiment provides a method wherein the identifier is read from a readable token positioned proximal a door, wherein locking of the door is controlled by an electrical actuator, wherein unlocking of the door defines the access control functionality, and wherein the signal causes the electrical actuator to unlock the door.

One embodiment provides a method wherein the server is configured to perform an authentication and authorisation process based on the device identity.

One embodiment provides a method wherein the data indicative of an identifier read by the mobile device using short-range wireless communications includes the identifier.

One embodiment provides a method wherein the data indicative of an identifier read by the mobile device using short-range wireless communications includes data defined by the mobile device on the basis of the identifier.

One embodiment provides a method, performed by a mobile device, for requesting access to a controlled functionality, the method including:

(i) reading an identifier using short-range wireless communications;

(ii) defining an access request, the access request being indicative of (i); an identifier read by the mobile device using short-range wireless communications and (ii) identity data carried by the mobile device;

(iii) transmitting the access request to a specific server device, thereby to request access to a controlled functionality associated with the read identifier.

One embodiment provides a method wherein the server device is configured to selectively grant access to the controlled functionality via a signal that is not provided to the mobile device.

One embodiment provides a method including determining, based on interaction with a user of the mobile device, biometric data, and wherein (ii) additionally includes adding the biometric data to the access request.

One embodiment provides a method wherein the controlled functionality is the unlocking of a specific door.

One embodiment provides a method wherein the identifier is read from a readable token positioned proximal the specific door.

One embodiment provides a method wherein locking/unlocking of the specific door is controlled by an electrical actuator.

One embodiment provides a method wherein a software application configured to perform steps (ii) and (iii) launches automatically in response to (i).

One embodiment provides a computer program product for performing a method as described herein.

One embodiment provides a non-transitive carrier medium for carrying computer executable code that, when executed on a processor, causes the processor to perform a method as described herein.

One embodiment provides a system configured for performing a method as described herein.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

BRIEF DESCRIPTION OF THE DRAWINGS

Embodiments of the invention will now be described, by way of example only, with reference to the accompanying drawings in which.

DETAILED DESCRIPTION

Figure 1A:
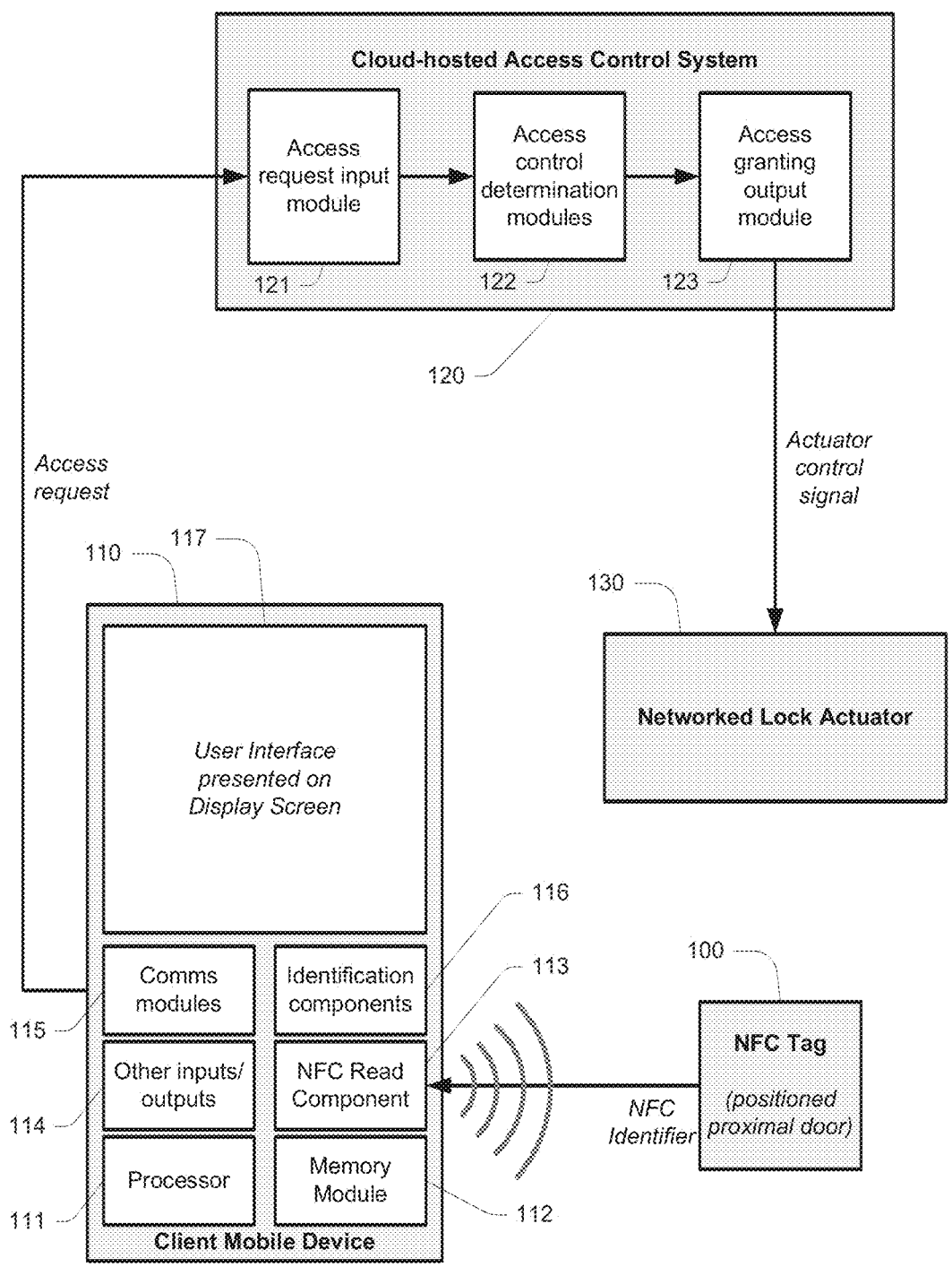
FIG. 1A schematically illustrates an access control framework according to one embodiment.

Described herein are systems and methods for enabling access control via mobile devices. Embodiments of the invention have been particularly developed for allowing a user to gain access to a controlled functionality (for example the unlocking of a door) using a smartphone or the like.

In overview, in some embodiments discussed herein make use of readable tags positioned alongside/proximal controlled functionalities (for example lockable doors, switches, and so on). For example, the tags may be various forms of short-range wireless readable tags, such as NFC-readable tags, Bluetooth Low Energy (BLE) tags (such as iBeacons) and the like. These tags are able to be read by mobile devices, such as smartphones.

In examples considered herein, upon reading such a tag, the smartphone performs functionality via an app (i.e. a software application) which defines an access request (alternatively the app may need to be launched prior to reading of the tag). The app may be executing as a background app and/or launched in response to reading of a tag. The access request is in some cases defined automatically, and in other cases defined in response to user interaction with the app.

This access request is transmitted to an access control system, which is preferably cloud hosted. The access request is indicative of the tag (for example including a value defined by or defined based upon the identifier), which allows the access control system to identify a controlled functionality associated with the tag (typically being a controlled functionality alongside/proximal the tag). The access request is also indicative of the smartphone (for example based on an inherent phone identifier, an identifier that is stored in memory the smartphone, or an identifier of a SIM card or the like carried by the smartphone). This allows the access control system to identify a user, and determine access privileges. In the case that the user is authorised to access the controlled functionality, the access control system provides a signal thereby to grant access to that controlled functionality.

As used herein, the term "controlled functionality" refers to a functionality that is under control of an access control system. For instance, an electronic door lock may be controlled by an access control system, in the sense that a signal to unlock the door is selectively provided by the access control system. This may be provided directly (from the access control system to the lock actuator), or indirectly (e.g. from the access control system to an intermediary controller which is in communication with the lock actuator). Although embodiments considered below focus primarily on controlled functionalities relating to locking/unlocking of doors, it should be appreciated that the invention is not necessarily limited as such.

Exemplary Framework—Installation

FIG. 1A, FIG. 1B, FIG. 1C, FIG. 1D and FIG. 1E illustrate exemplary frameworks according to embodiments. In overview, each depicts a framework whereby the operator of a client mobile device 110 (for example an iOS or Android smartphone) wishes to gain access through a locked door. The examples of FIG. 1A and FIG. 1B make use of NFC technology, whereby NFC tags are read by NFC reader modules. The examples of FIG. 1C, FIG. 1D and FIG. 1E correspond respectively to FIG. 1A and FIG. 1B, but make use of BLE technology (such as iBeacons) as an alternate form of wireless short range communication. It will be appreciated that, for the majority of purposes considered herein, NFC and BLE are equally suitable. However, BLE allows for additional advanced functionalities given technical advantages of that technology, for example in terms of range, motion detection as in FIG. 1E, and so on.

Figure 1B:
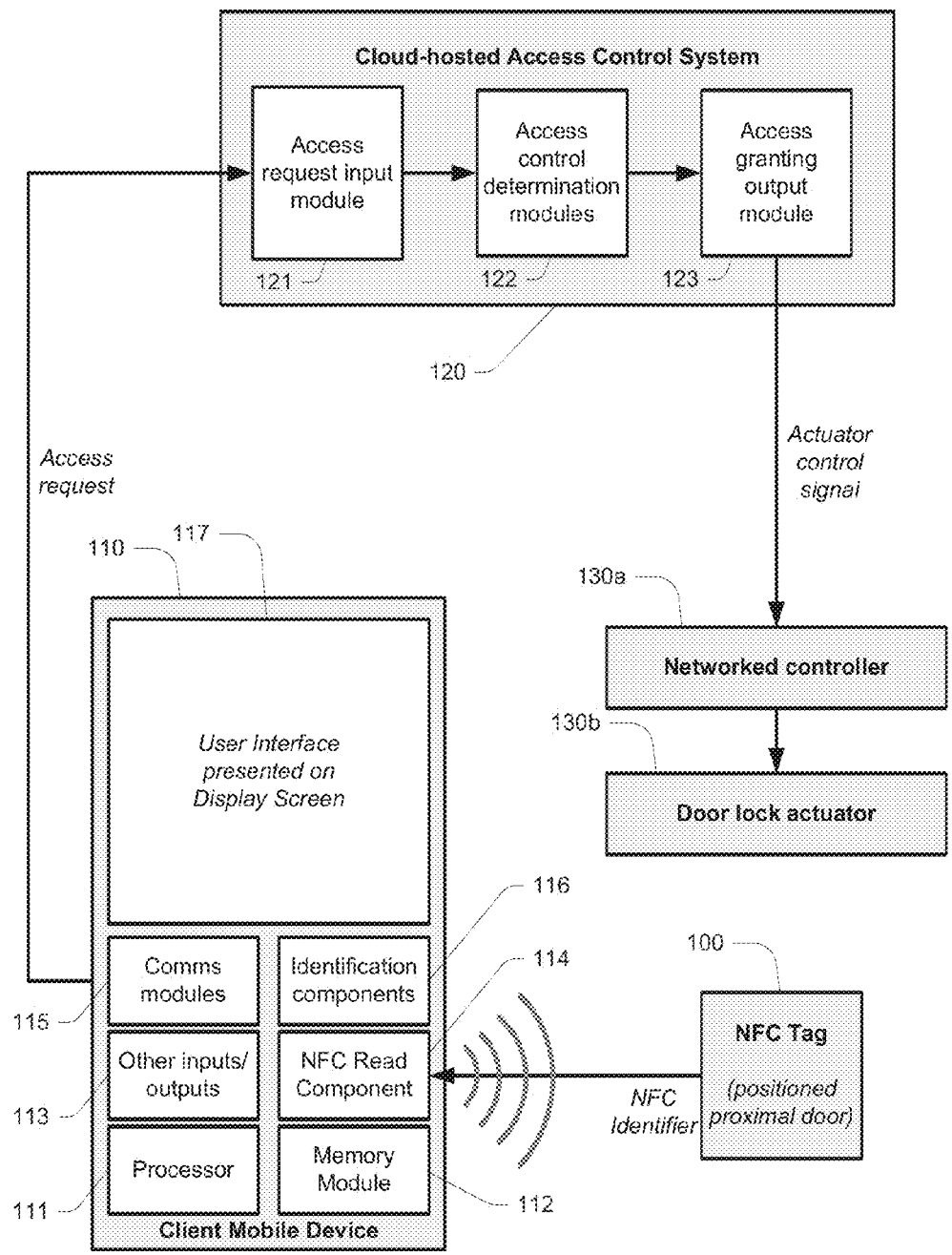
FIG. 1B schematically illustrates an access control framework according to one embodiment.
Figure 1C:
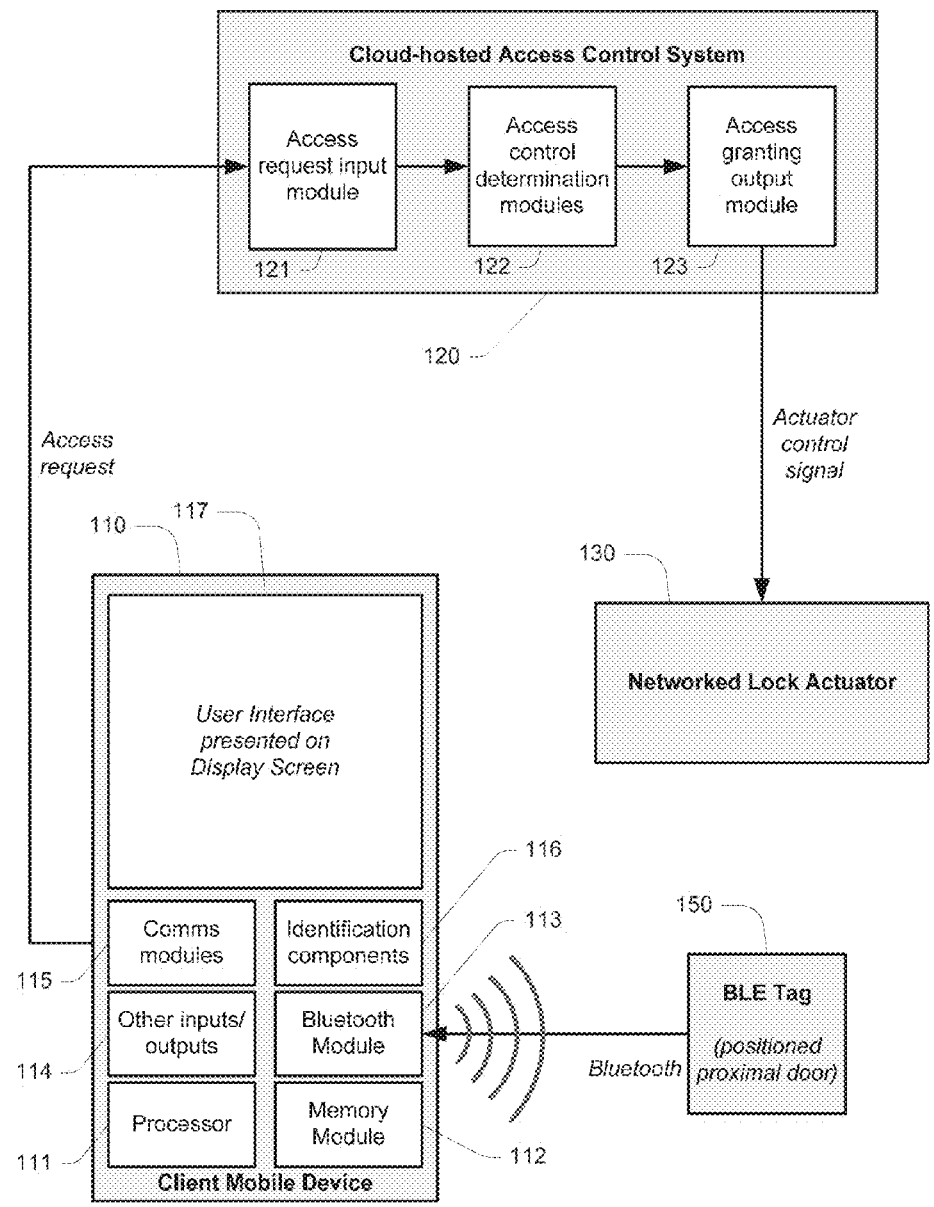
FIG. 1C schematically illustrates an access control framework according to one embodiment.
Figure 1D:
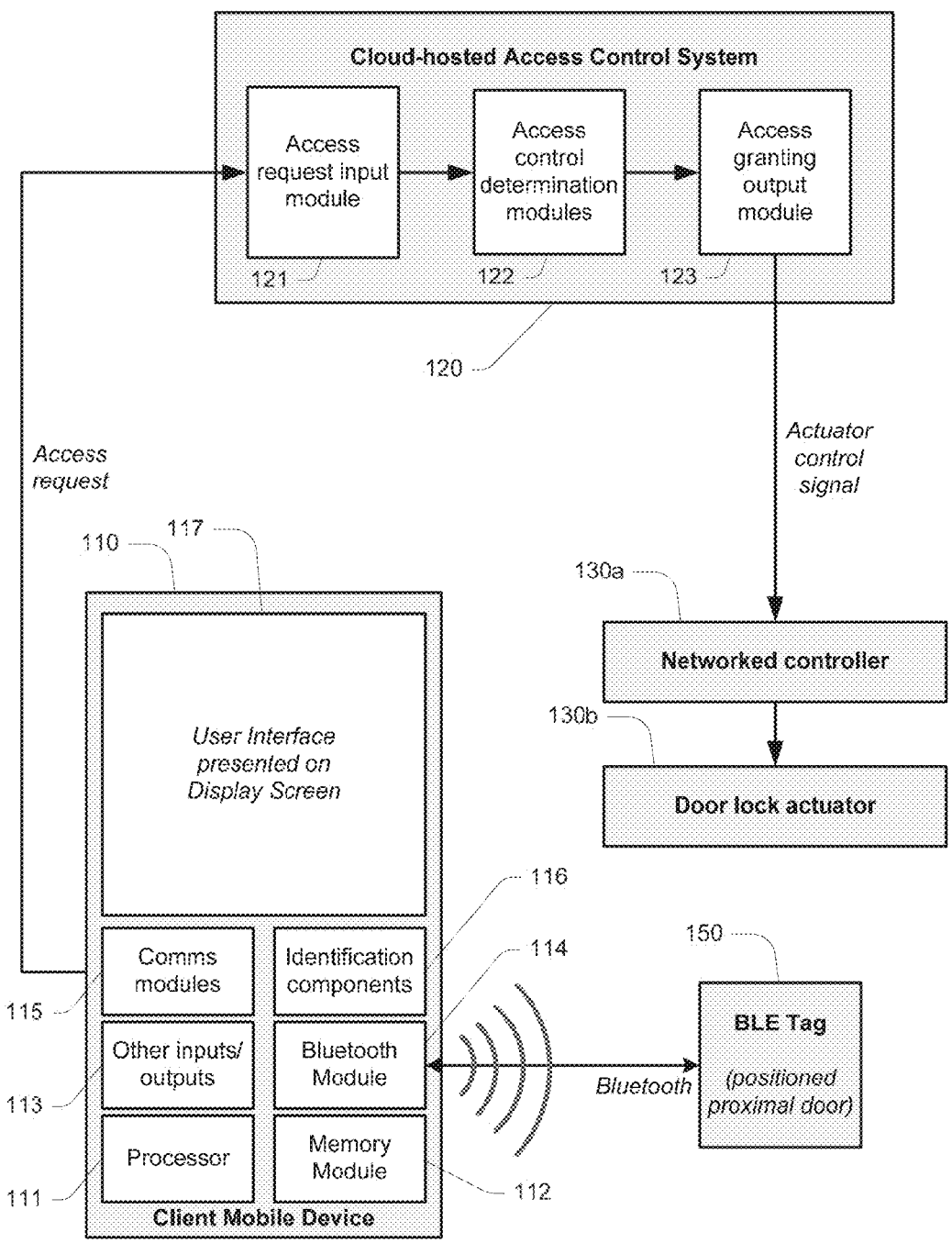
FIG. 1D schematically illustrates an access control framework according to one embodiment.
Figure 1E:
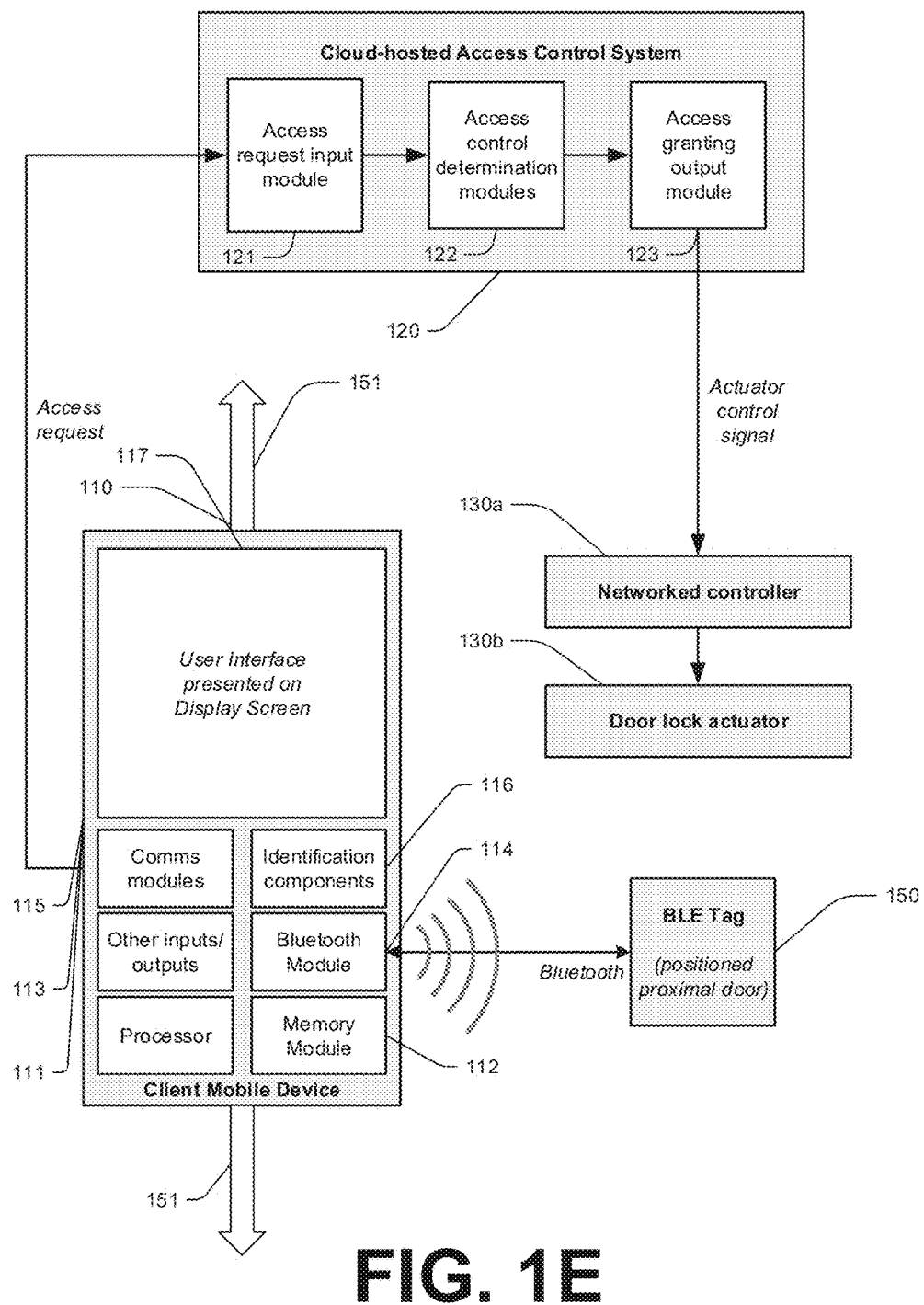
FIG. 1E schematically illustrates an access control framework according to one embodiment with motion detection.

As part of an initial installation process, the door is equipped with an electronically actuated lock. This may be by way of a physical lock (such as a catch, solenoid, or the like) coupled to a networked lock actuator 13 (as shown in FIGS. 1A and 1C), or by way of a physical lock that is coupled to an electronic door lock actuator 130b, which is in turn coupled to a networked controller 130a (as shown in FIGS. 1B, 1D and 1E) to achieve a similar overall result. In both cases, the door may be unlocked by transmitting a control signal to a specified network address. In some cases this signal may require certain embedded properties for security purposes.

As part of the installation process, the installer records data indicative of the specific networked lock actuator 130 (or networked controller 130a), thereby to facilitate appropriate addressing of a control signal. The precise manner in which this occurs varies between embodiments, for example based on specific configurationally aspects of hardware devices that are used. The user also records a description of the door (for example a textual description such as "entry into room X").

As part of the installation process for FIG. 1A and FIG. 1B, a near-field-communications (NFC) tag 100 is installed proximal the door, thereby to allow NFC-based identification of the door. For example, the tag may be affixed to a surface or structure defined by or proximal the relevant door (for instance in one embodiment tag 100 is embedded in an adjacent wall area, the location being optionally marked for purposes of identification). The precise positioning of the NFC tag is a matter of design choice, and it will be appreciated that in practice only persons who are authorised to access the door need know of its location. In a preferred embodiment the NFC tag is embedded in a wall, and its location designated by a marking on the wall, leading to what may be regarded as a clean minimalist architectural design.

The NFC tag carries a NFC tag identifier (as is customary), which is able to be read by NFC reader component (such as a NFC read component 114 carried by device 110). This may be an alphanumeric string used to uniquely identify tag 100. The installer associates the NFC with the door. Accordingly, from the installation process, the following aspects of data are associated with a given door:

(i) A network address that is used to communicate a lock/unlock message;

(ii) A NFC tag identifier for an NFC tag that is installed proximal the door; and (iii) A door description (for example a text-based description).

This data is optionally collected using a handheld device during installation (for example a tablet device or the like), and preferably maintained in a central database. In the examples described herein, this data is maintained in a database associated with a cloud-hosted access control system 120.

As part of the installation process for FIG. 1C, and FIG. 1D and FIG. 1E, a BLE tag 150 (for example an iBeacon tag) is installed proximal the door, thereby to allow Bluetooth-based identification of the door. For example, the tag may be affixed to a surface or structure defined by or proximal the relevant door (for instance in one embodiment tag 100 is embedded in an adjacent wall area, the location being optionally marked for purposes of identification). The precise positioning of the BLE tag is a matter of design choice, and it will be appreciated that in practice only persons who are authorised to access the door need know of its location. In a preferred embodiment the BLE tag is embedded in a wall, and its location designated by a marking on the wall, leading to what may be regarded as a clean minimalist architectural design. However, it will be appreciated that the nature of BLE technology may allow for more creative tag positioning, for example to enable monitoring of a person's movement towards the door as illustrated by arrows 151 in FIG. 1E.

The BLE tag carries a BLE tag identifier (as is customary), which is able to be read by Bluetooth reader component (such as a Bluetooth component 114 carried by device 110). This may be an alphanumeric string used to uniquely identify tag 100. The installer associates the BLE with the door. Accordingly, from the installation process, the following aspects of data are associated with a given door:

(i) A network address that is used to communicate a lock/unlock message;

(ii) A BLE tag identifier for an BLE tag that is installed proximal the door; and (iii) A door description (for example a text-based description).

This data is optionally collected using a handheld device during installation (for example a tablet device or the like), and preferably maintained in a central database. In the examples described herein, this data is maintained in a database associated with a cloud-hosted access control system 120.

Other embodiments may make use of technologies other than NFC or BLE thereby to enable wireless reading of a unique identifier from an object proximal a door (for example using optical means). Preferably, however, these make use of a passive (non-powered) component from which an identifier is read. In some cases optically readable identifiers may be used (for example barcodes, images, and the like), however it is preferable for those to be combined with a requirement for a GPS or other location-defining signal (or other approach to verify that the device is actually proximal the identifier-carrying substrate, as opposed to using a replica image of the identifier-carrying substrate).

In some embodiments writable NFC/BLE tags are used, such that the tag identifier is able to be custom-defined during installation. In this regard, the tag identifier and lock identifier may be rendered identical or in some way relatable.

Exemplary Framework—Configuration

Following installation, a cloud-hosted access control system (item 120 in FIG. 1A and FIG. 1B) is configured to perform access control determinations in respect of a given door for which installation has been completed. The precise manner in which this occurs is dependent on nuances of a given access control system, however for the present purposes it will be assumed that each door is configured to be associated with a one or more acceptable permissions. The access control system additionally stores, for a plurality of users, respective permissions for those users (which may be explicit, or inferred from user attributes). In this manner, configuration enables an access control determination which compares permissions associated with a user (or user token)

with acceptable permissions associated with a given door, and where there is a match between the permissions, it is determined that the user is authorised to access the door (i.e. to have the door unlocked).

In some cases a cloud-hosted access control system is configured to manage access control devices across a plurality of facilities (as opposed to a single facility having a single managing authority). For example, in some cases consumer-level users acquire hardware components (for example a lock and BLE/NFC tag) and configure their desired access control permissions via a web-based interface associated with system 120. For example, a user sets up an account, and inputs data indicative of a lock, associated tag, and user credentials that should be permitted to access that lock.

It should be appreciated that the above example of configuration is illustrative only, and that the manner by which configuration occurs will vary between embodiments.

Exemplary Framework—Operation

As noted, FIG. 1A to FIG. 1D illustrates exemplary frameworks according to embodiments. In overview, each depicts a framework whereby the operator of a client mobile device 110 wishes to gain access through a locked door.

Device 100 may be substantially any portable electronic devices having the components illustrated in FIG. 1A, for example a smartphone, tablet, or the like. Necessary components include:

- A microprocessor 111 configured to execute computer executable code (software instructions) thereby to provide functionality to the device.
- A memory module 112 that maintains computer executable code (software instructions) executable by processor 111. These preferably include software instructions representing a proprietary software application, herein referred to as an "access control app".
- A NFC read component, which is configured to read a NFC tag identifier from a NFC tag (such as NFC tag 100). In cases where a non-NFC identifier is used (for example a barcode or the like), an alternate read component may be used, such as a Bluetooth module as shown in FIG. 1C and FIG. 1D.
- One or more communications modules (such as cellular communications modules, WiFi, etc) which enable device 110 to communicate with a remote server (such as cloud-hosted access control system 120).
- One or more identification components, which are capable of securely and reliably identifying device 110. These may include hardware-based identification components (for example a SIM card, device hardware identifier, or the like) and/or software-based identifying components (for example an embedded security certificate or the like). In some embodiments the identification components are defined in software, for example in terms of a login/password combination associated with a particular software application.

Device 110 also includes a display screen 117 which is configured for displaying a user interface, and other inputs/outputs 114 (which may include the likes of microphones, speakers, touch-based interfaces, buttons, gyroscopes, sensors, cameras, and so on).

In the context of FIG. 1A, device 110 is configured to read a NFC tag 100, and more specifically to read an NFC identifier from that NFC tag, via NFC component 113. This NFC identifier is processed by the access control app (for which computer executable code is maintained by memory module 112 and executed by processor 111). In some embodiments device 110 is configured such that reading the tag automatically launches the app; in other embodiments a user launches the app prior to reading the tag. Based on reading of the tag, and other data maintained by and/or inputted into device 110, the app defines an access request which is transmitted to cloud hosted access control system 120.

In the context of FIG. 1B, device 110 is configured to read a BLE tag 150, and more specifically to read an BLE identifier from that BLE tag, via Bluetooth module 113. This BLE identifier is processed by the access control app (for which computer executable code is maintained by memory module 112 and executed by processor 111). In some embodiments device 110 is configured such that reading the tag automatically launches the app; in other embodiments a user launches the app prior to reading the tag. Based on reading of the tag, and other data maintained by and/or inputted into device 110, the app defines an access request which is transmitted to cloud hosted access control system 120.

System 120 is described by reference to a set of software-based modules, which are defined by reference to their respective functionalities. From a hardware respective system 120 may be defined by one or more computing devices, for example by a set of servers. An access request input module 121 is configured for receiving access requests from devices, for example from device 110. Access control determination modules 122 determine whether the request is to be approved or denied. For example, this includes authenticating the request (in terms of submitting user), and determining whether or not the submitting user is authorised to access the controlled functionality. For example, system 120 maintains access to one or more data repositories that define user access permissions and permission requirements for controlled functionalities. If the request is approved, an access granting module 123 is configured to transmit a signal thereby to provide physical access to the controlled functionality. For example, in the context of FIG. 1A, an actuator control signal is transmitted to a networked lock actuator 130. In the contest of FIG. 1B, the signal is transmitted to a networked controller 130a coupled to a door lock actuator 130b. In further embodiments there are additional components intermediate module 123 and a hardware component ultimately responsible for the physical unlocking. In any case, the signal ultimately results in unlocking of the door.

It will be appreciated that, although the above example is directed to unlocking of a door, in other embodiments alternate controlled functionalities are present.

Exemplary Methods

Figure 2B:
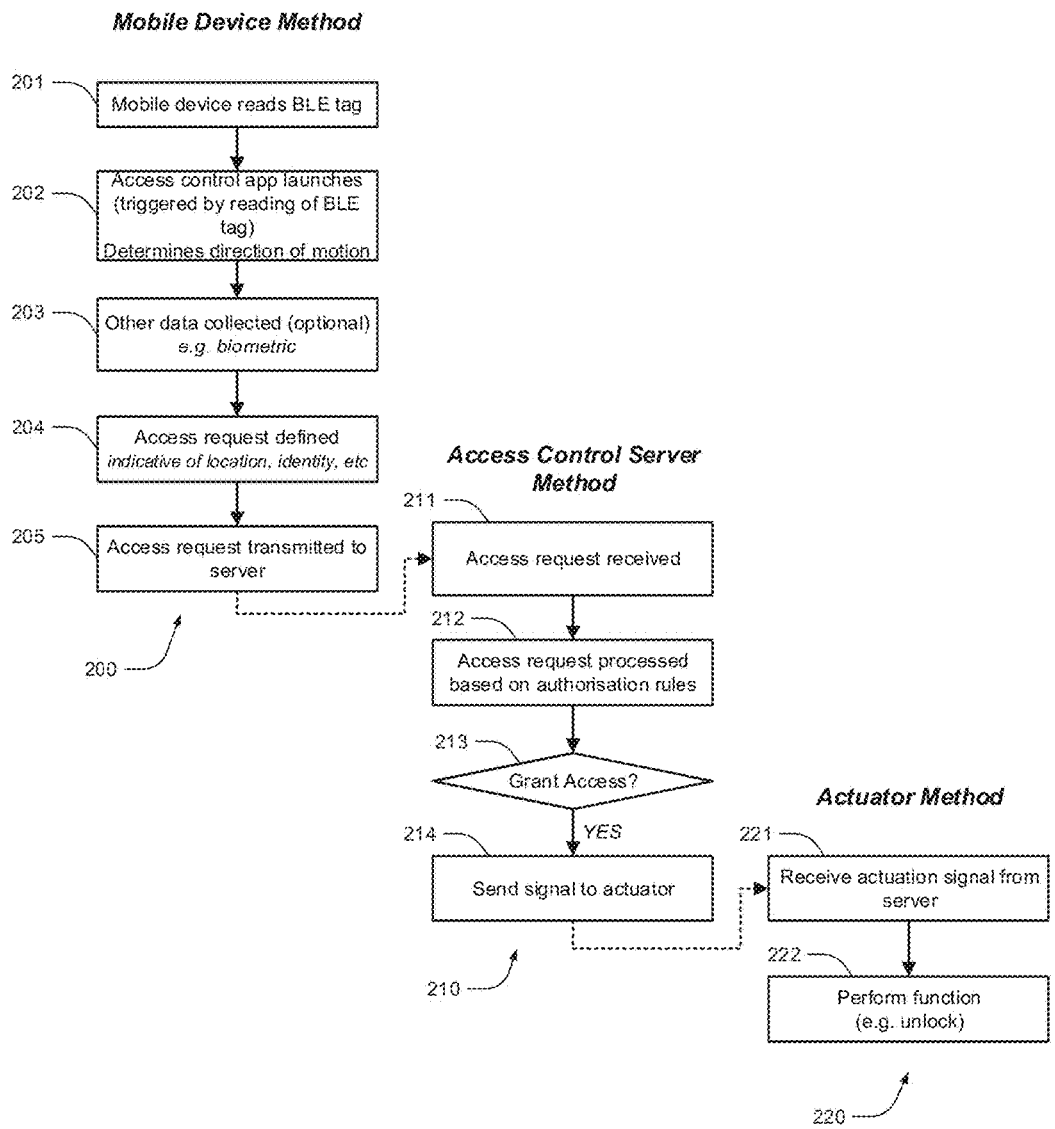
FIG. 2 illustrates a method according to one embodiment.

FIG. 2 illustrates a set of exemplary related methods, being computer-implemented methods performed based on execution of computer-executable code at respective devices involved in an access control method. These are: a mobile device method 200, an access control server method 210, and an actuator method 220. These are described by reference to NFC technology, however it will be appreciated that in other embodiments that is substituted for BLE or other forms of short-range wireless communication.

Functional block 201 represents a process whereby a mobile device reads an identifier from an NFC tag, this triggering the launching of an access control app at 202. In other embodiments these steps are reversed (i.e. the app is launched manually prior to reading of the tag). In some embodiments a NFC reader component in the mobile device is configured to recognise a predetermined portion/aspect of the NFC identifier and treat that as the trigger to launch the access control app.

Functional block 203 represents a process including collecting additional data. This is optional, and not present in all embodiments. The additional data may include the likes of biometric data, location data, password data, and so on. This data may be used to enhance an access request. For example, in some cases the access control app prompts a user to provide identifying information (such as biometric data and/or a password) thereby to assist in confirming the identity of the user of the mobile device.

Functional block 203 represents a process including defining an access request. This includes a set of data that allows an access control system to identify:

(i) A controlled functionality in respect of which access is sought. For example, this may include or be derived from the NFC tag identifier.

(ii) A requesting user. The requesting user may be deemed based on properties of the requesting device (i.e. the user implied from the device), and/or personal identifying information (such as biometric data) collected at 203. The device may be identified by any one or more hardware and/or software based identifiers carried by the device.

The access request may also carry additional information, such as location data representing a current location of the mobile device.

Functional block 205 represents a process whereby the access request is transmitted to an access control server. Preferably data contained therein is encoded and/or encrypted.

Functional block 211 of method 210 represents a process whereby an access request is received from a mobile device. This access request is processed at 212 based on a set of authorisation rules. This includes:

(i) Determining the device and/or user responsible for submitting the request.

(ii) Determining the controlled functionality in respect of which the request is made.

(iii) Determining whether the device and/or user is authorised to access the controlled functionality in respect of which the request is made.

In this context, the expression "device and/or user" is used to convey that in some cases the request identifies a device, in some case the device identifies a device that is associated with a user, in some cases the request identifies a user (independent of data identifying the device), and in some cases the request identifies the device and the user (independent of data identifying the device), and in some cases the request identifies the device.

If it is determined that device and/or user is authorised to access the controlled functionality in respect of which the request is made, then a decision is made at 213 to grant access. This results in a signal being sent, as represented by block 214, to a predefined address associated with the controlled functionality in respect of which the request is made, for example being a signal to a networked actuator (or other component configured to receive and handle such signals). The signal is preferably encrypted and secure, such that it is not able to be replicated by other devices thereby to gain unauthorised access.

The signal sent at 214 is received, in this example, by a networked actuator at 221, and in response to the signal the actuator performs its function. For example, in the case of a networked lock actuator, the function is to perform an "unlock" (typically a temporary "unlock") functionality. However, it will be appreciated that the nature of functionalities may vary between embodiments.

Exemplary Mobile App

Figure 4:
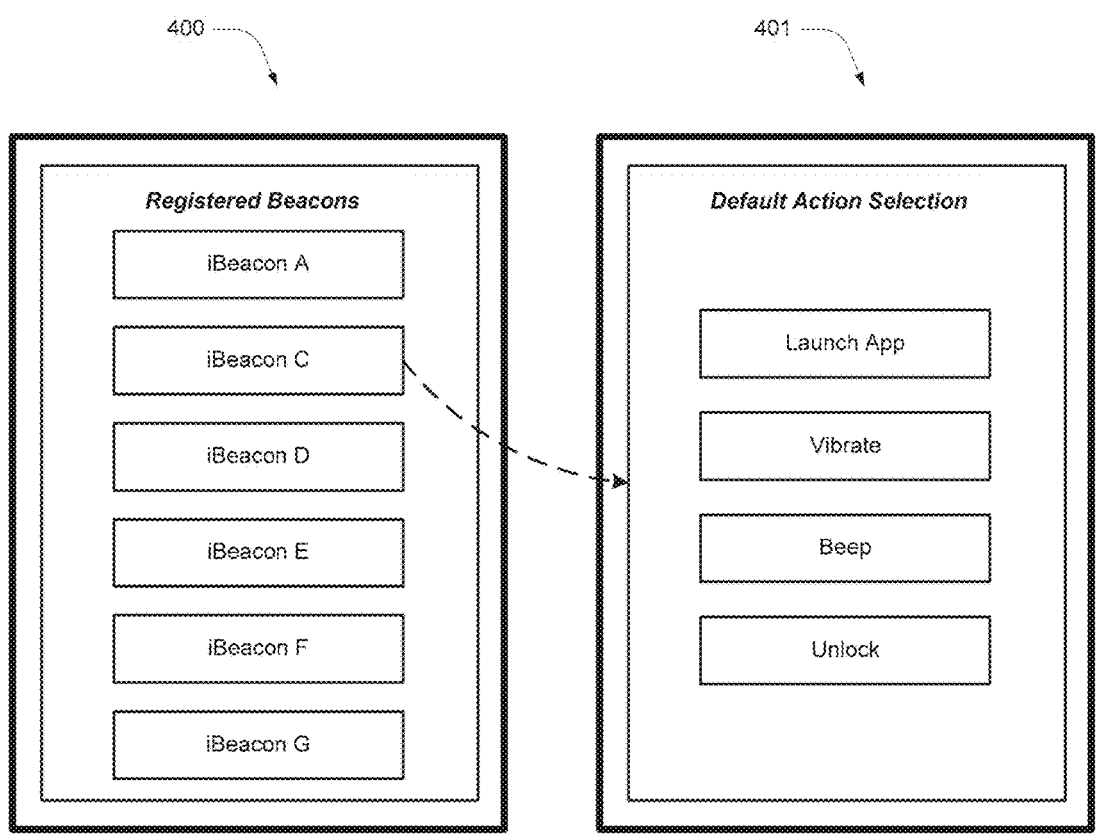
FIG. 4 illustrates exemplary screenshots from a mobile app according to one embodiment.

FIG. 4 illustrates exemplary screenshots from a mobile app according to one embodiment. These are (i) a screen 400 which displays a selection of proximal iBeacons; and (ii) a screen 401 which enables a user to assign default functionalities to a selected iBeacon. It will be appreciated that in this example iBeacons could be substituted for other BLE/NFC tags, or other technologies.

In overview, screen 400 displays a selection of iBeacons, for example by reference to descriptive names (for example "server room door", "meeting room lights", or the like). In some cases a user is able to modify these names. The selection of displayed iBeacons may include either or both of iBeacons for which the user has access rights and iBeacons currently in reading range.

A user may select an iBeacon via screen 400, and then via screen 401 set a default functionality for that iBeacon. For example, these may include options to vibrate, open the app, unlock a door, and so on. Preferably the list of available functionalities is server defined (for example a limiting a list of selectable functionalities available to a user). Additionally, these may be proximity and/or motion dependent. For example, a functionality may require that a user be within a certain range of an iBeacon/door, and/or moving towards an iBeacon/door from a predefined direction as shown in box 202 in FIG. 2B.

In some embodiments the app is configured to require periodic user identification (for example biometric). This may vary between iBeacons, dependent on security levels. For example, in some cases user identifications is required: (i) upon initial entry to a facility, but not once inside; (ii) at regular intervals (for example hourly); or (iii) for every interaction relating to certain iBeacons.

Exemplary Client-Server Framework

Figure 3:
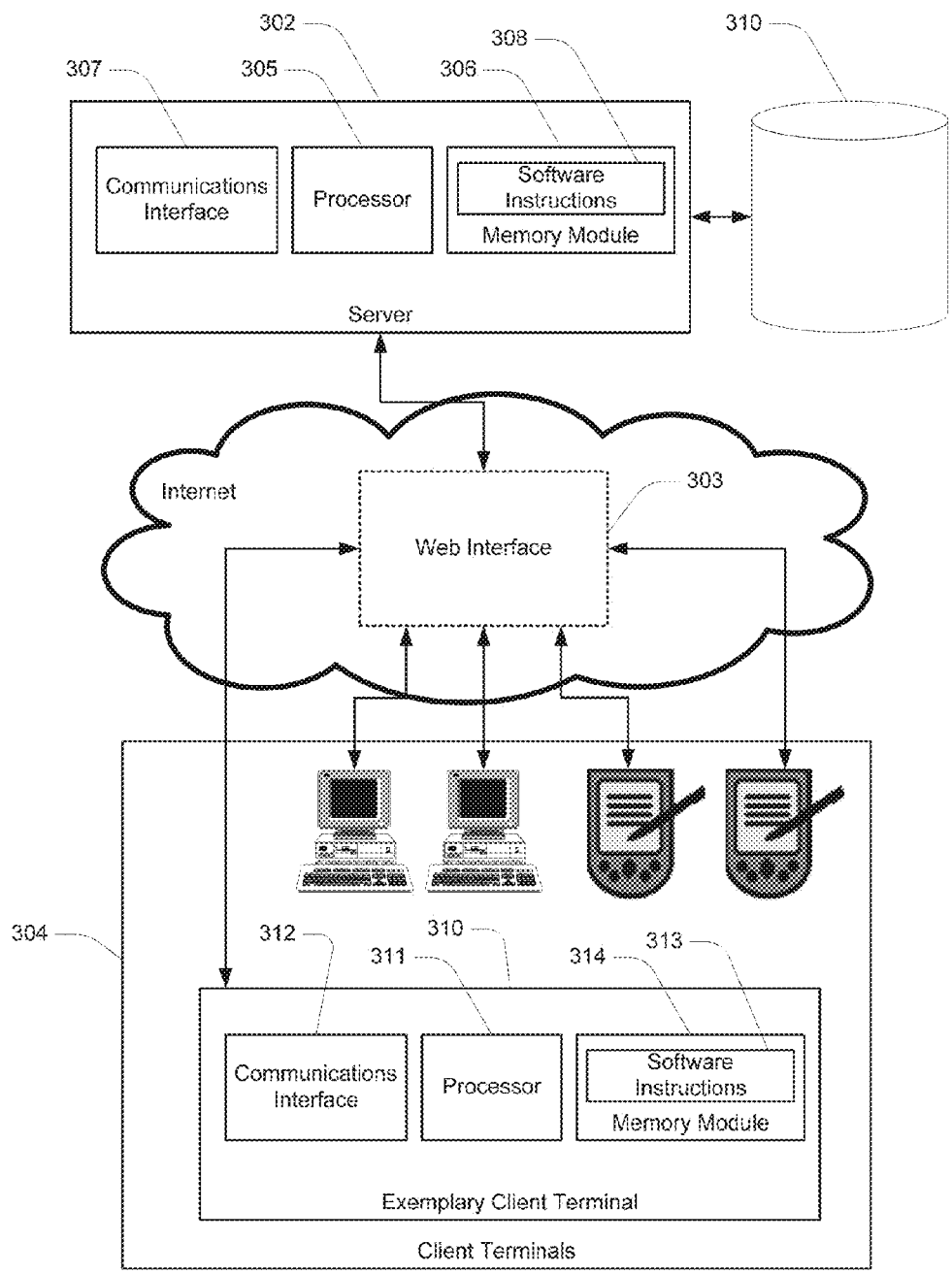
FIG. 3 illustrates a client-server framework leveraged by some embodiments.

In some embodiments, methods and functionalities relevant to the technology discussed herein are implemented by way of a server, as illustrated in FIG. 3. For example, such an arrangement may be used to enable provision of a user interface thereby to allow users to interact with a cloud-hosted access control system for functionalities such as:

Configuring associations between tag identifiers and actuators.

Registering devices and/or users.

Configuring/managing access permissions.

Accessing logs us user activity.

In overview, a web server 302 provides a web interface 303. This web interface is accessed by the parties by way of client terminals 304. In overview, users access interface 303 over the Internet by way of client terminals 304, which in various embodiments include the likes of personal computers, PDAs, cellular telephones, gaming consoles, and other Internet enabled devices.

Server 303 includes a processor 305 coupled to a memory module 306 and a communications interface 307, such as an Internet connection, modem, Ethernet port, wireless network card, serial port, or the like. In other embodiments distributed resources are used. For example, in one embodiment server 302 includes a plurality of distributed servers having respective storage, processing and communications resources. Memory module 306 includes software instructions 308, which are executable on processor 305.

Server 302 is coupled to a database 310. In further embodiments the database leverages memory module 306.

In some embodiments web interface 303 includes a website. The term "website" should be read broadly to cover substantially any source of information accessible over the Internet or another communications network (such as WAN, LAN or WLAN) via a browser application running on a client terminal. In some embodiments, a website is a source of information made available by a server and accessible over the Internet by a web-browser application running on a client terminal. The web-browser application downloads code, such as HTML code, from the server. This code is executable through the web-browser on the client terminal for providing a graphical and often interactive representation of the website on the client terminal. By way of the web-browser application, a user of the client terminal is able to navigate between and throughout various web pages provided by the website, and access various functionalities that are provided.

Although some embodiments make use of a website/browser-based implementation, in other embodiments proprietary software methods are implemented as an alternative. For example, in such embodiments client terminals 304 maintain software instructions for a computer program product that essentially provides access to a portal via which framework 100 is accessed (for instance via an iPhone app or the like).

In general terms, each terminal 304 includes a processor 311 coupled to a memory module 313 and a communications interface 312, such as an internet connection, modem, Ethernet port, serial port, or the like. Memory module 313 includes software instructions 314, which are executable on processor 311. These software instructions allow terminal 304 to execute a software application, such as a proprietary application or web browser application and thereby render on-screen a user interface and allow communication with server 302. This user interface allows for the creation, viewing and administration of profiles, access to the internal communications interface, and various other functionalities.

CONCLUSIONS AND INTERPRETATION

It will be appreciated that the disclosure above provides various significant systems and methods for enabling access control functionalities. In particular, it provides for a scalable solution that allows mobile devices such as smartphones to be used to gain access to controlled functionalities, for example to unlock doors and the like.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one or more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method, performed at an access control server, for selectively granting access to a controlled functionality, the method including:

receiving, via networked communications in an access request from a software application on a mobile device, data indicative of (i); an identifier read by the mobile device using short-range wireless communications and (ii) a mobile device identity, wherein the mobile device is configured to monitor the movement of the mobile device relative to the identifier using the short range wireless communications and provide that data in response to performing a direction-of-motion-dependent determination that satisfies predefined requirements, the determination being based on direction of motion of the mobile device relative to either of: (a) a device carrying the identifier; or (b) a location associated with an access control device such that the data is only provided when the mobile device is moving towards (a) or (b) from a predefined direction;

determining, based on the data indicative of the identifier read by the mobile device, a specific access control functionality;

determining, based on at least the data indicative of the mobile device identity, whether or not access to the specific access control functionality is to be granted; and in the case that the specific access control functionality is to be granted, sending a signal to a network location associated with the specific access control functionality, thereby to control a hardware component that is configured to grant access to the specific access control functionality.

2. A method according to claim 1 further comprising:
additionally receiving, from the mobile device, biometric data captured by the mobile device; and
determining, based on at least the data indicative of the mobile device identity and the biometric data, whether or not access to the specific access control functionality is to be granted.

3. A method according to claim 1 wherein the specific access control functionality is the unlocking of a specific door.

4. A method according to claim 3 wherein the identifier is read from a readable token positioned proximal the specific door.

5. A method according to claim 3 wherein locking/unlocking of the specific door is controlled by an electrical actuator.

6. A method according to claim 5 wherein the electrical actuator is configured to receive a control signal via a network.

7. A method according to claim 5 wherein the electrical actuator is configured to connect to a local wireless network.

8. A method according to claim 1 wherein the identifier is read from a readable token positioned proximal a door, wherein locking of the door is controlled by an electrical actuator, wherein unlocking of the door defines the access control functionality, and wherein the signal causes the electrical actuator to unlock the door.

9. A method according to claim 1 wherein the server is configured to perform an authentication and authorisation process based on the device identity.

10. A method according to claim 1 wherein the identifier read by the mobile device using short-range wireless communications is an identifier read from a Bluetooth Low Energy token using Bluetooth communications.

11. A method according to claim 1 wherein the identifier read by the mobile device using short-range wireless communications is an RFID read from a RFID tag token using RF communications.

12. A non-transitive carrier medium carrying computer executable code that, when executed on a processor, causes the processor to perform a method according to claim 1.

13. A method, performed by a mobile device, for requesting access to a controlled functionality, the method including:

reading an identifier using short range wireless communications;

performing a direction-of-motion-dependent determination using the short range wireless communications thereby to determine the direction of motion of the mobile device relative to either of: (a) a device carrying the identifier; or (b) a location associated with an access control device;

in the case that the direction-of-motion-dependent determination indicates that the mobile device is moving towards (a) or (b) from a predefined direction, defining an access request, the access request being indicative of (i) the identifier read by the mobile device; and (ii) identity data carried by the mobile device;

transmitting the access request to a specific server device, thereby to request access to a controlled functionality associated with the read identifier.

14. A method according to claim 13 wherein the server device is configured to selectively grant access to the controlled functionality via a signal that is not provided to the mobile device.

15. A method according to claim 13 including determining, based on interaction with a user of the mobile device, biometric data, and wherein the method additionally includes adding the biometric data to the access request.

16. A method according to claim 13 wherein the controlled functionality is the unlocking of a specific door.

17. A method according to claim 16 wherein the identifier is read from a readable token positioned proximal the specific door.

18. A method according to claim 16 wherein the mobile device provides an interface that enables a user to associate a selected default functionality with the reading of a specific identifier.

19. A method according to claim 18 wherein the interface provided by the mobile device enables a user to associate a selected default functionality with reading of a specific identifier in a proximity/motion dependent manner.

20. A method according to claim 13 wherein a software application configured to perform the defining and transmitting of the access request launches automatically in response to the reading of the identifier.

21. A non-transitive carrier medium carrying computer executable code that, when executed on a processor, causes the processor to perform a method according to claim 13.

* * * * *